(12) United States Patent
Narasimhan et al.

(10) Patent No.: US 8,818,337 B2
(45) Date of Patent: Aug. 26, 2014

(54) APPLICATION OF COMMUNITY-DEFINED DESCRIPTORS TO MOBILE CONTENT

(75) Inventors: Srivathsan Narasimhan, Sunnyvale, CA (US); Eric F. Allen, Burlingame, CA (US); Skot Leach, Dublin, CA (US); Hudson George, Benicia, CA (US); Lincoln Lydick, Livermore, CA (US); Yu-Jen Dennis Chen, Livermore, CA (US); Adam Lavine, Livermore, CA (US); Silvy Mathews, Mountain House, CA (US)

(73) Assignee: FunMobility, Inc., Pleasanton, CA (US)

( * ) Notice: Subject to any disclaimer, the term of this patent is extended or adjusted under 35 U.S.C. 154(b) by 1763 days.

(21) Appl. No.: 11/617,315

(22) Filed: Dec. 28, 2006

(65) Prior Publication Data
US 2008/0162503 A1    Jul. 3, 2008

(51) Int. Cl.
*H04M 1/725* (2006.01)
(52) U.S. Cl.
USPC ............... 455/412.1; 455/412.2; 715/230; 715/233; 707/748; 707/749; 707/750; 707/751

(58) Field of Classification Search
USPC ............... 455/412.1–412.2; 705/14, 104.1; 707/748–751, 754, 104.1; 715/230, 715/233, 530
See application file for complete search history.

(56) References Cited

U.S. PATENT DOCUMENTS

| | | | |
|---|---|---|---|
| 7,451,177 B1 * | 11/2008 | Johnson et al. | 709/203 |
| 7,508,419 B2 * | 3/2009 | Toyama et al. | 348/211.3 |
| 7,558,828 B1 * | 7/2009 | Panzer | 709/206 |
| 2007/0016575 A1 * | 1/2007 | Hurst-Hiller et al. | 707/5 |
| 2008/0126191 A1 * | 5/2008 | Schiavi | 705/14 |

\* cited by examiner

*Primary Examiner* — Wayne Cai
(74) *Attorney, Agent, or Firm* — Maschoff Brennan

(57) ABSTRACT

A method of organizing mobile content in a network environment is provided that includes providing pieces of mobile content on a database, selecting one of the pieces of mobile content, receiving a descriptor to be associated with the selected piece of mobile content from user activity, and associating the descriptor to the selected piece of mobile content.

17 Claims, 2 Drawing Sheets

APPLICATION OF COMMUNITY-DEFINED DESCRIPTORS TO MOBILE CONTENT

BACKGROUND

1. The Field of the Invention

The present invention relates generally to the field of providing media content to mobile devices over a network.

2. Background and Relevant Art

Portable electronic devices, such as cellular telephones, personal digital assistants (PDAs), laptop computers, smart telephones, and other electronic devices are widely used for business and personal purposes. As usage of portable electronic devices has increased, a market for products and services related to portable electronic devices has developed. Users of portable electronic devices are provided with a wide variety of software, applications, and service choices to enhance the features and usage capabilities of portable electronic devices.

Many products and services available for use with portable electronic devices can be downloaded from networks, such as cellular telephone networks, the Internet, the World Wide Web, or other global networks. For example, portable electronic device users can download music, games, ring tones, wallpaper, screen savers, graphics, photos and other applications directly from cellular telephone networks or global networks to their portable electronic devices. In this way, users can personalize their portable electronic devices as desired.

In order to maximize the amount of content users download, service providers seek to facilitate users' discoverability and access to the mobile content. Efforts to ease discoverability and access (search and browse) to relevant mobile content include the use of banners, browseable libraries, and search engines. While such approaches provide access to the mobile content, they frequently require more navigation than users are willing to perform. The navigation of some graphical content, such as pictures, photos, images and wallpapers, may be particularly difficult. In particular, wallpaper may be difficult to categorize in a way that is meaningful to the users.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

According to one example, a method of organizing mobile content is provided in a network environment that includes providing pieces of mobile content on a database, receiving descriptors associated with the pieces of mobile content from the activity of users of the network, and applying the descriptors to at least one piece of mobile content.

In another example, a system for organizing mobile content on a network is provided that includes a mobile content server, the server having a mobile content database associated therewith having mobile content stored thereon. The mobile content database may also have server software residing thereon for receiving and fulfilling calls from client devices. The system also includes community recommendation engine. The community recommendation engine is configured to provide descriptors associated with the mobile content. The descriptors are based on users' activities on the network, and to classify and organize the descriptors using collaborative filtering techniques.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages will be set forth in the following description and in part will be obvious from the description or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

A system and method are described herein for applying community-defined descriptors to mobile content that are based on the activities of members of a network community. According to one example, the community-defined descriptors are applied to the mobile content using collaborative filtering techniques. The collaborative filtering may be performed explicitly or implicitly. Explicit collaborative filtering may include receiving proposed tags or descriptors, ratings, or other input directly from users in response to a request. The descriptors applied to the mobile content may be a tag, keyword or phrase that has particular meaning to the user with respect to the mobile content. For example, the descriptor may reflect the user's impressions, thoughts, or categorizations of the mobile content.

Examples of implicit collaborative filtering include gleaning information about the mobile content by tracking and analyzing the activities of members of the network with respect to the mobile content. For example, the rate at which a piece of mobile content is viewed, purchased or shared may provide an indication of the popularity of the piece within the network community. Additionally, the frequency with which a term is used in describing the piece in conversations, groups, or other interactive settings may provide a descriptor for the piece that has relevance to the community. Using the community-defined descriptors, mobile content providers may then be able to provide relevant content and access to mobile content in a way that is relevant to the community. Mobile content providers may provide the user access to the mobile content in a number of ways. Embodiments herein may comprise a special purpose or general-purpose computer including various computer hardware, as discussed in greater detail below.

Figure 1:
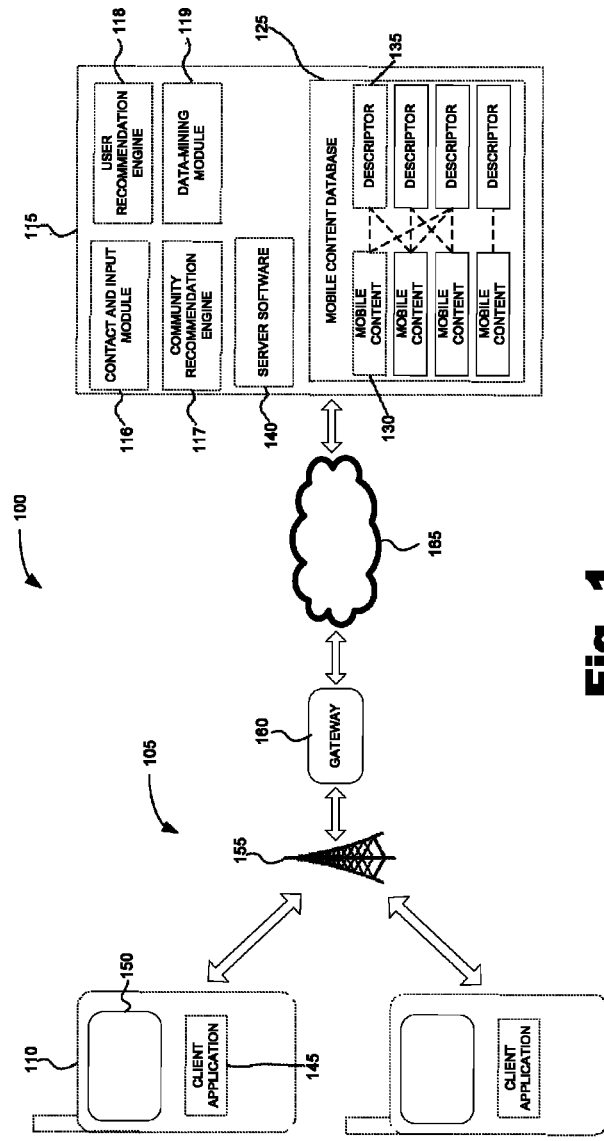
FIG. 1 illustrates an exemplary system for providing mobile content.

FIG. 1 illustrates a system 100 for providing mobile content. The system 100 according to the present example operates over a network 105. The network 105 may be a cellular telephone network (including a cellular communication link), the World Wide Web or another aspect of the Internet, a Local Area Network (LAN), or any other network. A mobile electronic device, such as a communication device 110 may be connected to the network 105 via a wireless connection, such as a connection used in cellular telephone networks, an 802.11 connection, a Bluetooth connection, a WiMAX connection, or any other wireless connection; or the communication device 110 may be connected to network 105 via a wired connection.

As will be discussed in more detail below, the system 100 utilizes input received from the users as well as information related to the users' activities. The input and activity-related information may include, without limitation, user-application interaction, user-user interaction and user-content interaction. This information may be used to provide community-defined descriptors, to categorize and classify the mobile content and to determine how to present the mobile content over the network. Such a configuration may increase the relevance of the descriptors applied to the mobile content as well as increase the relevance of the mobile content presented to the community as a whole and/or to individual users. This configuration also increases the relevance of how the content is provided to the community as a whole and/or to individual users.

The server side of the network 105 includes a mobile content server 115. For ease of reference, a single mobile content server 115 will be discussed. One skilled in the art will appreciate that any number of servers or other devices may be combined to provide the functionality described below with reference to the mobile content server 115. Continuing with FIG. 1, several modules reside on the mobile content server 115, including, without limitation, a contact and input module 116, a community recommendation engine 117, a user recommendation engine 118, a data-mining module 119, and the mobile content database 125.

The mobile content database 125 may reside on the mobile content server 115 or may be coupled to the mobile content server 115 through an internal or external connection. The mobile content database 125 has mobile content 130 stored thereon. Examples of mobile content stored on the mobile content server 115 may include, without limitation, wallpapers, music, videos, greetings, messages, news, games, ring tones, screen savers, wallpaper, graphics, and other electronic data generally downloaded from the Internet or global network. One or more pieces of mobile content 130 has at least one community-defined descriptor 135 associated therewith that is defined, maintained, and/or varied based on the users' activities within the network community. As used herein, a community-defined descriptor shall be broadly used to refer to a description or other attribute associated with the mobile content that has been provided by users' activities within the network community. The descriptors may be received directly from the users or gleaned from their network activities. Community-defined descriptors 135 include, without limitation, tags, rating scales or symbols, recommendations, preferences, settings, or other descriptors. Tags or descriptors may be labels, such as textual elements, applied to provide an indication of the impression, meaning, context, or other information that is relevant to a given user. The process of applying tags may be referred to as tagging.

The mobile content server 115 provides access to the mobile content 130 stored on the mobile content database 125 over the network 105, as previously discussed. In particular, according to one example server software 140 residing on the mobile content server 115 interacts with a client application 145 residing on the client devices, such as communication device 110. For ease of reference, the communication device 110 will be referred to as a client device 110 when describing interaction with the mobile content server 115.

The descriptors 135 are conveyed over the network 105 to the devices connected thereto, including the client device 110. The client device 110 includes a user interface that includes a display screen 150. According to one example, the descriptors 135 are arranged in a format that is capable of being browsed and displayed on the display screen 150. In another example, the descriptors displayed may be provided as search results in response to a search request submitted by a user and displayed on the display screen 150. In yet another example, the client device 110 receives the descriptors 135 sent over the network 105 and causes the descriptors 135 to be moved across a portion of the display screen 150. According to a further example, the descriptors 135 may be settings or other configurations determined by the community, such as screen settings. The descriptors 135, as well as the mobile content 130 associated therewith, may be presented to the network community with relatively high confidence that the descriptors 135 are relevant to the users within the community because the users have provided the descriptors 135. This interaction will be described in more detail below.

In any case, the mobile content server 115 and client device 110 cooperate to provide mobile content to a user using server software 140 and a client application 145. The tasks may be split as desired between the client application 145 and the server software 140. The client application 145 makes use of links to access the mobile content. According to the present example, the client application 145 includes an application interface that displays links to the user that are associated with the mobile content. These links are displayed on the display portion 150 of the client device 110. The links may be provided by the application interface in a number of ways, as previously discussed. When the user selects a link, the client application 145 requests the mobile content 130 associated with the link from mobile content server 115. The request sent from the client device 110 also includes information about the client device 110 and/or the user. For example, this information may include the time the request was made, as well as information about the client device 110 and the user profile associated with the client device 110 and other information.

In FIG. 1, the client device 110 is a cellular telephone in wireless communication with a tower 155 that communicates with a gateway 160. The gateway 160 serves as a bridge between the protocols of the wireless network in which the device 110 operates and other networks such as the Internet 165. The gateway 160 thus converts a transmission in one domain to another or from one protocol to another. For example, wireless application protocol (WAP) to hyper text transfer protocol (HTTP). In this example, the device 110 is transmitting over a wireless network using protocols that are common to cellular telephones. The gateway 160 receives the transmission from the device 110 and forwards the transmission over the Internet 165 to the mobile content server 115 using the appropriate Internet protocol. Similarly, the gateway 160 converts data transmitted over the Internet 165 from the mobile content server 115 into the appropriate wireless protocol for transmission to the device 110.

Using this type of exemplary environment, the device 110 can request and receive mobile content from a mobile content database 125 associated with the mobile content server 115. According to one example, the contact and input module 116 receives these requests from the client device 110. The contact and input module 116 directs this information to the mobile content database 125 and to the server software 140. The server software 140 fulfills the request and sends the requested information, which may include mobile content 130, back to the client device 110.

The requested information returned to the client device 110 may also include a command for the client application 145 to display an input prompt with the mobile content 130. The input prompt allows the user to input a descriptor 135 that describes some aspect of the mobile content 130. For example, according to one example, the input prompt includes a field for receiving a proposed tag for the mobile content and/or a rating scale that the user is able to use to input a proposed rating for the mobile content 130. If the user chooses to enter a descriptor 135 in the input prompt, that information is then sent to the mobile content server 115, along with information indicating which piece of mobile content 130 is associated with each descriptor 135.

The proposed descriptor 135 is stored on the mobile content database 125. The association between the proposed descriptor 135 and the piece of mobile content 130 is also stored on the mobile content database 125. According to one embodiment collaborative filtering may be used by the system to generate community-defined descriptors 135. The collaborative filtering may be explicit such that specific input is received from a user for a selected piece of mobile content. Further, the collaborative filtering may be implicit, such that the descriptors 135 are gleaned from the behavior of members of the network community. Thus, at least some of the descriptors 135 associated with the mobile content 130 may be described as community-defined descriptors.

Continuing with one example of explicit collaborative filtering, the community recommendation engine 117 and the user recommendation engine 118 use explicit collaborative techniques to code the input explicitly received from all of the users to provide community-defined descriptors 135. In particular, the community recommendation engine 118 makes use of this input as well as the information stored on the mobile content database 125 to categorize and classify descriptors 135 associated with the mobile content 130. One example of the application of a descriptor 135 such as a tag will be discussed in more detail below with reference to FIG. 2.

The descriptors can be defined at a peer level since individual users can access mobile content and apply user defined descriptors. The cumulative collection of descriptors associated with each piece of mobile content is combined to form a collaborative collection of descriptors for the mobile content. Thus, members of the network community can collaborate to provide a descriptor for each piece of mobile content. In particular, each user applies a descriptor to specific content in a way that the descriptor is defined by the user to give specific meaning to it so that the content can be readily obtained on future searches.

Continuing with reference to FIG. 1, the community recommendation engine 117 is also configured to use collaborative filtering techniques based on other interaction with the mobile content by other users. In particular, the community recommendation engine 117 may be configured to analyze data residing on the mobile content database 115 as to which descriptors 135 the user browses. The system may also track how frequently mobile content 130 is added to a given wish list; shared, such as by gifting or recommending; purchased; or is otherwise selected by users.

The community recommendation engine 117 uses the information related to the activities of the users, both those explicitly input by the users and other user activities, including user-application interaction, user to user interaction during activities like sharing and gifting, content to content interaction when two different pieces of content are purchased by the same user and user-content interaction to provide community-defined descriptors 135, to categorize and classify the mobile content 130, and to determine how to provide access to the mobile content 130 over the network 105.

In addition to using the interaction between users and mobile content 130 in establishing community-defined descriptors 135, the system can be configured in other ways. For example, the system can be configured to analyze the interaction between users and the client application 145. User interaction with the client application 145 may include, without limitation, the use of previews, purchases, browsing, and searching. Further, additional information gleaned from user interaction with the client application 145 may include user identity and profile information. This information, as well as any information related to users' activities, may be stored on the mobile content database 125 and accessed by other modules, such as the data-mining module 119 to establish correlations in the information.

The information received by the mobile content server 115 is used to personalize which mobile content 130 is conveyed to the client device 110 in the future. In particular, in one example, the data-mining module 119 processes the information on the mobile content database 125 associated with the user to find correlations. The user recommendation engine 118 then uses this and other information gleaned by the data-mining module 119 to determine which mobile content 130 should be conveyed to the client device 110 in the future.

According to one example, the user recommendation engine 118 makes use of a correlation matrix to determine whether other users have similar preferences. If sufficient similarities are found, the user recommendation engine 118 notes the changes and recommends the mobile content 130 in the determined format at a later point. For instance, the user recommendation engine 118 periodically changes the links to the recommended content. Links provided in a browseable format may be refreshed periodically. Similarly, links provided in a tag ticker format may be refreshed periodically as desired, such as every four hours. In any case, when the server software receives a request, the server software processes the request.

In addition to user-specific recommendations, the system 100 also provides community recommendations. The community recommendation engine 117, for example, uses the information related to the activities of the users, such as information that is explicitly input by the users and other user activities, including user-application interaction and user-content interaction to provide community-defined descriptors 135. The information is used in the community recommendation engine to categorize and classify the mobile content 130, and to determine how to provide access to the mobile content over the network 105.

In particular, the community recommendation engine 117 can make use of a correlation matrix in determining dynamic content suggestions based on the activities of the communities. For example, in the case of user to application interaction, the community recommendation engine may determine which search terms are frequently used and which of the results returned for such searches are more frequently selected. In such an example, the community recommendation may preferentially provide links to the community in general related to such content.

The community recommendation engine 117 is also configured to determine the interaction between pieces of mobile content 130 based on the user activities over the network 105. For example, according to one example, the community recommendation engine 117 may determine which community-defined descriptors 135 are commonly grouped together. This may be accomplished in a number of ways. For example, the correlation may be accomplished by locating the same or similar community-defined descriptors 135 associated with different pieces of mobile content 130. Additionally, the community recommendation engine 117 may use implicit collaborative filtering on the output of the data-mining module 119 to analyze social activities, not limited to gifting sharing and discussing about a particular content, to further categorize and classify the community-defined descriptors 135. For example, the community recommendation engine 117 may analyze conversations to determine which descriptors 135 are commonly used together. If the correlation is sufficiently strong, the community recommendation engine 117 may apply such descriptors to the mobile content 130 to thereby provide community-defined descriptors 135 when a related community-defined descriptor 135 is also provided.

In addition to providing community-defined descriptors, the community recommendation engine 117 may be configured to vary the weight given to a community-defined descriptor 135 as it relates to a piece of mobile content 130. In particular, according to one example the community recommendation engine 117 selects the mobile content 130 to be presented to the community and/or individual users based on the relevancy of the mobile content 130.

Relevancy to the community may be determined in several ways. For example, relevancy may be determined using such factors as average or mean ratings using a rating scale or through the application and organization of tags or descriptors. The community recommendation engine 117 may be configured to vary the relative weight afforded to the descriptors 135 depending on the mobile content 130. In particular, the relevancy of a wallpaper may depend on the tags, such that the tags may be more heavily weighted than other descriptors, such as rating. Similarly, with respect to audio pieces, rating may be more heavily weighted than tags. Such a configuration allows the system to use multiple descriptors to provide relevant mobile content 130. One method of applying community-defined descriptors 135 to mobile content 130 and of applying community-defined tags to wallpapers in particular will now be discussed in more detail.

Figure 2:
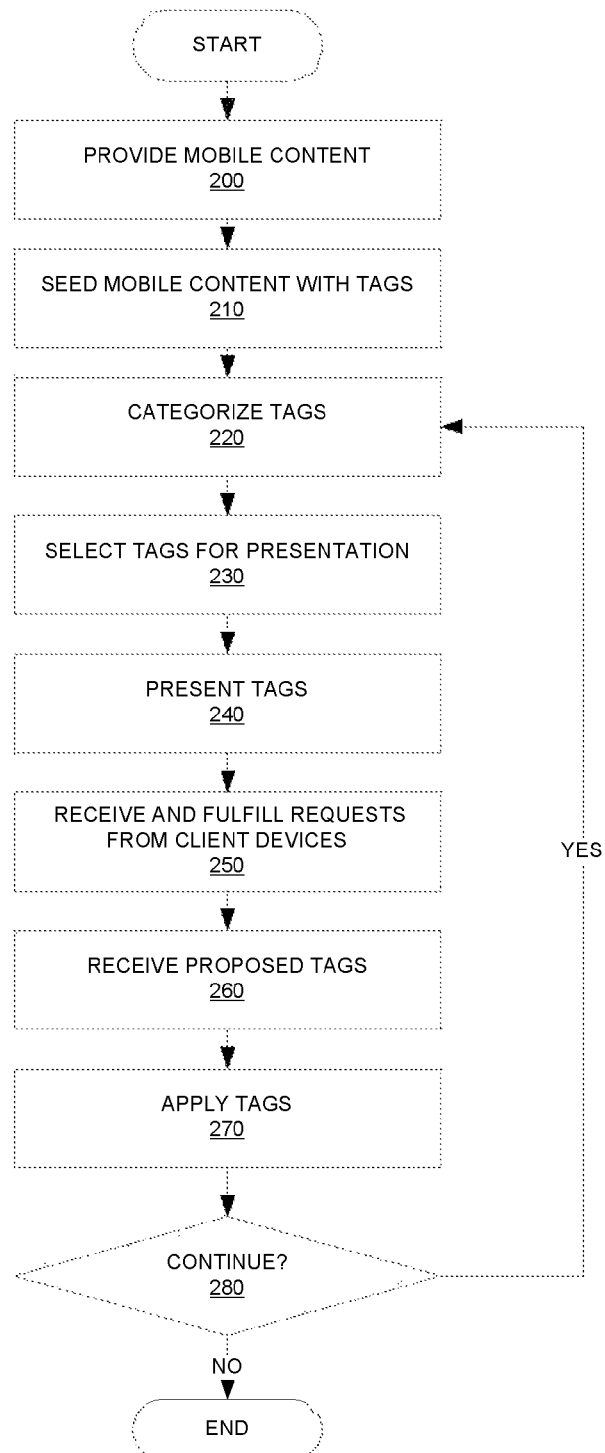
FIG. 2 is a flowchart illustrating a method of applying community-defined descriptors to mobile content.

FIG. 2 is a flowchart illustrating a method of applying community-defined descriptors to mobile content and a method of applying community-defined tags to wallpapers in particular. The application of descriptors to mobile content may allow users to recall the content later in time. Additionally, users may be able to group similar items together using the same or similar descriptors while using an individual naming convention. These individually applied descriptors are then applied and combined to provide community-defined descriptors. The community-defined descriptors may then be used to provide relevant mobile content to the community, such as through providing relevant search results and providing links to relevant content in a variety of ways.

The process of tagging wallpapers will be discussed first followed by a discussion of the application of other community-defined descriptors. While steps are discussed in a given order, one skilled in the art will appreciate that the steps may be performed in a different order and that some steps may be performed simultaneously with other steps and that some steps may be omitted as desired. Further, those of skill in the art will appreciate similar steps may be applied to other types of community-defined descriptors.

The exemplary method illustrated in FIG. 2 begins at 200 by providing mobile content to the user. As previously introduced, mobile content may include any media content that is capable of being downloaded and accessed by a mobile device. In the case of the present example, the mobile content can be wallpaper. The mobile content may be provided initially on a mobile content database associated with a mobile content server. The mobile content server is connected to a network. Software residing on the mobile content server makes the mobile content accessible to multiple mobile devices. While a mobile content server has been described, one skilled in the art will appreciate that mobile content may be provided in a number of ways in which the mobile content is available to members of a network community. Further, while providing mobile content is described as an initial step, the mobile content may be continually added, modified, or removed as desired.

The mobile content is then seeded with descriptors as referred to in FIG. 2. For example, software residing on the mobile content server allows the mobile content server to receive a preliminary descriptor for the mobile content. According to the present example, a content provider who supplies wallpapers may initially apply a tag to each piece of wallpaper.

In another example, selected members of the community may be first provided with access to the wallpapers to seed the mobile content with tags. The selected members of the community initially apply tags to any number of pieces of wallpaper or all of the wallpapers. The artists who produce each piece of mobile content or those who are initially responsible for distributing the mobile content may provide one or more descriptors for each of the selected pieces of mobile content. In any case, software residing on the mobile content server allows for the mobile content on the mobile content database to be seeded with the descriptors.

In addition to initially seeding the mobile content with descriptors, at 220 the tags may be preliminarily categorized. According to the present example, software residing on the mobile content server initially categorizes wallpaper into groups that are likely to be sought out by category. The wallpaper may be categorized by group such as content likely to be relevant to men, women, or other groups. Further, the wallpaper may be initially grouped as being more likely to be relevant for persons looking for animation, cars, fantasy scenes, or any other category or designation. The categorization of descriptors and content can be done either by the data-mining module 119 in FIG. 1 or manually by the mobile content provider. In either case, the tags associated with each category would be retrieved when the category is selected.

Once the mobile content has been seeded and initially categorized, software residing on the mobile content server makes the descriptors available over the networks. Tags are selected at 230 for presentation to the users. According to the present example, the tags are presented at 240 by the communication devices that display the tags as links, which link to the wallpapers on the mobile content database.

Initially, the system may present seeded descriptors associated with a broad range of categories. The mobile content may be selected at random or may be otherwise selected. For example, search criteria may be relevant with an audience such as a user, a group of users, members of the entire community, and/or members of other communities or networks. In particular, the system may track the searches and/or other usage of the audience. The system may then determine which tags may be relevant to the audience based on previous searches. In any case, the tags selected for transmission over the network are made accessible over the network to connected communication devices.

Members of the network community are then able to access the descriptors on the connected communication devices. As previously introduced, the descriptors may be accessed in a variety of ways, including through software residing on a client device or mobile content server that provides a browseable catalog, a search engine, and/or a descriptor ticker. At 250 of the present example, when a user selects a tag, software residing on the mobile content server receives the request from the client device and serves the request by providing the corresponding set of wallpapers to the user. At 260, the mobile content server receives proposed tags from client devices. For example, a user is able to propose additional tags as the user sees fit. The proposed tags are then received by the mobile content server.

Since members of the community apply the descriptors, the descriptors may be referred to as community-defined descriptors. So, for example, tags applied by members of the community may be referred to as community-defined tags. According to one example, any person with access to the network may propose tags to be applied to the wallpapers. In another example, known and/or trusted users are able to propose additional tags or modify tags that have been applied. In such an example, access to the tags may be controlled by software residing on the mobile content server using a password and/or registration process such that only known and/or trusted users are able to modify and/or add tags to the mobile content. Once an identification and/or trust have been established, the user is then able to propose a tag as desired. In one example, users access the mobile content server via communication devices, such as cellular telephones. If information is provided before, during, or after the request is placed that identifies the user, such as by the user's telephone number, the user may then be identified by that telephone number and allowed to add tags to the wallpapers.

The proposed descriptors are then applied to the mobile content by software residing on the mobile content server. For example, at 270 tags are applied to wallpaper stored on the mobile content server. When a tag is applied, the applied tag becomes one of the tags associated with the selected wallpaper. As a result, when users view the selected wallpaper, the system indicates that the applied tag is then associated with the selected wallpaper. Further, reviewing the database search results that include the tag may provide access to the selected wallpaper. The application of the applied tag to the selected mobile content may occur in real time, near real time, or may be delayed by a desired period.

Once the descriptor has been applied, the method will repeat if the method continues its process to define additional tags (YES, at 280). Accordingly, the descriptors associated with each piece of mobile content are grouped and categorized at 220 by software residing on the mobile content server. Further, the categorization may be performed at the peer level rather than in a hierarchal manner. As a result, each descriptor may belong to a set of categories, including no categories to one or more categories. In addition, multiple descriptors that are input together may be treated as a single descriptor. Further, if the same descriptor is proposed for a piece of mobile content several times by the same user, only one instance of the descriptor may be applied to the mobile content if it otherwise meets the application criteria described below while the additional instances of the descriptor will be discarded. The categorization process may also be performed as desired. According to one example, the applied descriptors are categorized immediately. According to another example, categorization is performed periodically, such as every four hours or at some other interval.

As introduced, tags may be specifically applied to wallpapers. A wallpaper will be discussed for illustration that includes several elements. The wallpaper may include several elements such as a beach scene in which sand, a beach, water, ocean, palm trees, and a canoe are all illustrated. The tags that are received and applied may include each of these tags as well as other tags that are selected and applied by members of the network community. For example, a preliminary tag such as "a beach" may have been applied to the wallpaper. In such an example, the other tags may be applied after a user proposes them.

As the tag is applied, the software may separately categorize the tag with a different wallpaper that includes sand, such as a desert scene, and again separately categorized the tag with another wallpaper in which the ocean is displayed, such as a scene illustrating the open ocean. Further, the wallpaper may be categorized with scenes that include multiple tags together, such as another scene that includes a beach, water, ocean, and a palm tree. In any case, the classification or grouping of tags may be performed using any suitable process into as many or as few categories or classifications as desired.

It may also be desirable for selected users or administrators to be able to modify or delete descriptors. For example, some members of the community may provide incorrect, inappropriate, or clearly irrelevant tags to the wallpapers. In such a case, an administrator or other person may be able to use the software residing on the mobile content server to access the mobile content database and modify or delete the tags. The software may also allow keyword searches for misspelled or inappropriate words to be performed on the proposed tags and/or tags in the database. The tags found during the search may then be modified or deleted as desired.

Additionally, it may be desirable for the system to allow selected users or administrators to control the manner in which certain tags are accessed. For example, the software may be configured to select with which tags users are presented based on previous user activity. For example, certain controversial themes may be excluded by default. If, however, the user seeks out such material, tags related to that content may then be made available to the user in any of the formats previously discussed.

The processes, methods of use, and examples of components listed in the invention are illustrative and not inclusive. The invention may be embodied in other specific forms without departing from its spirit or essential characteristics. The described embodiments are to be considered in all respects only as illustrative and not restrictive. The appended claims are presented to illustrate the embodiments of the invention disclosed herein.

Accordingly, a system and method have been described herein for applying community-defined descriptors to mobile content, which are based on the activities of members of a network community. According to one example, the community-defined descriptors are applied to the mobile content using collaborative filtering techniques. The collaborative filtering may be performed explicitly or implicitly. Explicit collaborative filtering may include receiving proposed tags or descriptors to mobile content, the rating of mobile content, or other input directly from users in response to a request. The descriptors applied to the mobile content may be a tags, keywords or phrases that have particular meaning to the user with respect to the mobile content. For example, the descriptor may reflect the user's impressions, thoughts, or categorizations of the mobile content. In either case, with explicit collaborative filtering the system specifically receives the input from users and processes the input to apply community-defined descriptors.

Examples of implicit collaborative filtering include gleaning information about the mobile content by tracking and analyzing the activities of users of the network with respect to the mobile content. For example, the rate at which a piece of mobile content is purchased or shared may provide an indication of the popularity of the piece within the network community. Additionally, the frequency with which a term is used in describing the piece in conversations, groups, or other interactive settings may provide a descriptor for the piece that has relevance to the community. Using the community-defined descriptors, mobile content providers may then be able to provide relevant content and access to content in a way that is relevant to the community. Mobile content providers may provide access to the mobile content to the user in a number of ways.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM, or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of organizing mobile content in a network environment, the method comprising:
   providing pieces of mobile content on a database;
   receiving preliminary descriptors to be associated with the pieces of mobile content, the preliminary descriptors configured to be received from a selected subset of users of a community within the network environment that were first provided with access to the pieces of mobile content before such access was provided to other users of the community within the network environment;
   associating the preliminary descriptors to the pieces of the mobile content;
   categorizing the pieces of mobile content according to the preliminary descriptors;
   receiving a selection of a piece of mobile content from a user of the community within the network environment;
   receiving a community descriptor to be associated with the selected piece of mobile content from the user of the community;
   determining a weight for the community descriptor based on a content type of the selected piece of mobile content, the weight of the community descriptor describing a degree of relevance between the community descriptor and the selected piece of mobile content;
   associating the community descriptor and the weight of the community descriptor to the selected piece of mobile content; and
   recategorizing the selected piece of mobile content according to the community descriptor.

2. The method of claim 1, wherein the step of providing the pieces of mobile content further comprises providing electronic data selected from a group consisting of at least one of wallpapers, photos, music, videos, greetings, messages, news, games, ring tones, screen savers, graphics and electronic data downloaded from a global network.

3. The method of claim 1, wherein the step of receiving the community descriptor includes explicitly receiving an input from the user.

4. The method of claim 3, wherein receiving the input from the user includes receiving at least one of a tag and a rating.

5. The method of claim 4, wherein the step of recategorizing the selected piece of mobile content according to the community descriptor further comprises categorizing and classifying the selected piece of mobile content using collaborative filtering techniques.

6. The method of claim 5, wherein the step of recategorizing the selected piece of mobile content according to the community descriptor includes using explicit collaborative filtering techniques.

7. The method of claim 6, wherein receiving the input from the user includes receiving a proposed tag for a wallpaper.

8. The method of claim 1, wherein the step of receiving the preliminary descriptors further comprises performing data mining on information related to user activities to determine correlations between the preliminary descriptors and the pieces of mobile content.

9. The method of claim 8, wherein the step of recategorizing the selected piece of mobile content according to the community descriptor further comprises categorizing and classifying the selected piece of mobile content using collaborative filtering techniques.

10. The method of claim 1, wherein the step of receiving the community descriptor includes receiving user activity selected from at least one of user to content interaction, user to application interaction, content to content correlations, and user to user interaction.

11. The method of claim 1, wherein the step of associating the preliminary descriptors further comprises filtering words to remove inappropriate, irrelevant, and user-redundant descriptors.

12. The method of claim 1, wherein:
   the selected subset of users that were first provided with access to the pieces of the mobile content includes users that are initially responsible for distributing the pieces of mobile content; and the preliminary descriptors are configured to be received from the users that are initially responsible for distributing the pieces of mobile content.

13. The method of claim 1, wherein:

the selected subset of users that were first provided with access to the pieces of the mobile content includes users that produce the pieces of mobile content; and the preliminary descriptors are configured to be received from the users that produce the pieces of mobile content.

14. A method of organizing mobile content in a network, the method comprising:

providing visual mobile content on a database;

receiving one or more preliminary tags for the visual mobile content to be associated with the visual mobile content, the one or more preliminary tags configured to preliminarily define the visual mobile content, wherein the one or more preliminary tags are received from a selected subset of users of a community within the network that were first provided with access to the visual mobile content before such access was provided to other users of the community within the network;

associating the one or more preliminary tags to the visual mobile content;

organizing the visual mobile content according to the one or more preliminary tags;

receiving community tags from users of the community within the network, the community tags corresponding to the visual mobile content and defining the visual mobile content;

determining weights for the community tags based on a content type of the visual mobile content, the weights of the community tags describing degrees of relevance between the community tags and the visual mobile content;

organizing and categorizing the community tags using collaborative filtering techniques; and applying the community tags including the weights of the community tags to the visual mobile content.

15. The method of claim 14, wherein the step of providing the visual mobile content includes providing at least one wallpaper.

16. The method of claim 14, wherein the step of receiving the community tags from users includes receiving tag input in response to prompts displayed on a communication device.

17. The method of claim 16, wherein the step of receiving the community tags from users includes receiving tag input in response to prompts displayed on the communication device while an associated piece of the visual mobile content is displayed.

* * * * *